United States Patent
Eulerich et al.

(10) Patent No.: US 10,570,951 B2
(45) Date of Patent: Feb. 25, 2020

(54) METHOD FOR MANUFACTURE OF A CHASSIS MODULE AND CHASSIS MODULE MANUFACTURED ACCORDING TO SUCH A METHOD

(71) Applicant: ZF Friedrichshafen AG, Friedrichshafen (DE)

(72) Inventors: Wolfgang Eulerich, Osnabrück (DE); Andreas Welzel, Belm (DE); Guido Kohlbrecher, Wallenhorst (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 992 days.

(21) Appl. No.: 15/078,201

(22) Filed: Mar. 23, 2016

(65) Prior Publication Data
US 2016/0281772 A1    Sep. 29, 2016

(30) Foreign Application Priority Data
Mar. 27, 2015    (DE) .................. 10 2015 205 628

(51) Int. Cl.
| | |
|---|---|
| *F16C 11/06* | (2006.01) |
| *B23K 33/00* | (2006.01) |
| *B23K 11/26* | (2006.01) |
| *B23K 9/16* | (2006.01) |
| *B23K 11/00* | (2006.01) |
| *B23K 11/34* | (2006.01) |
| *B23K 101/00* | (2006.01) |

(52) U.S. Cl.
CPC ............ *F16C 11/0685* (2013.01); *B23K 9/16* (2013.01); *B23K 11/002* (2013.01); *B23K 11/26* (2013.01); *B23K 11/34* (2013.01); *B23K 33/006* (2013.01); *B23K 33/008* (2013.01); *F16C 11/0623* (2013.01); *F16C 11/0695* (2013.01); *B23K 2101/006* (2018.08); *F16C 2226/36* (2013.01)

(58) Field of Classification Search
CPC combination set(s) only.
See application file for complete search history.

(56) References Cited

U.S. PATENT DOCUMENTS

| | | | |
|---|---|---|---|
| 7,367,743 B2 | 5/2008 | Bernhardt et al. | |
| 9,010,783 B2 * | 4/2015 | Meyer .................. | F16C 11/069 280/124.134 |
| 9,227,480 B2 * | 1/2016 | Jekel ..................... | B60G 7/005 |

FOREIGN PATENT DOCUMENTS

DE    203 11 595 U1    2/2004

* cited by examiner

*Primary Examiner* — Daniel J Wiley
(74) *Attorney, Agent, or Firm* — Davis & Bujold PLLC; Michael J. Bujold (57) ABSTRACT

A method of producing a chassis module (1) with a structural component (3) having a through-going aperture (5) into which a ball joint housing (7) is inserted. An outer periphery of the ball joint housing (7) is connected all round to an edge section (9) of the aperture (5) by a first material-cohesive joining (11) without a filler. In order to stabilize the ball joint housing (7) in the aperture (5), the ball joint housing (7) is additionally connected all round to an inner wall section (13) of the aperture (5) at a location spaced away from the edge section (9), by a second material-cohesive joining (15) without a filler. The chassis module (1) is produced by the method, and the chassis module is in the form of a flanged connector (1) or a multi-point link.

15 Claims, 6 Drawing Sheets

METHOD FOR MANUFACTURE OF A CHASSIS MODULE AND CHASSIS MODULE MANUFACTURED ACCORDING TO SUCH A METHOD

This application claims priority from German patent application serial no. 10 2015 205 628.7 filed Mar. 27, 2015.

FIELD OF THE INVENTION

The invention concerns a method for producing a chassis module and a chassis module produced by such a method.

BACKGROUND OF THE INVENTION

Chassis modules of the type concerned are known in many different designs. As a rule these comprise a structural component and one or more ball-and-socket joints permanently connected thereto. For example, such a chassis module forms a suspension link, wherein the ball joint is integrated into the structural component by insert molding, pressing, screwing, riveting or welding.

From DE 203 11 595 U1 a ball joint with a ball joint housing is known, which has a welding section by means of which it can be welded to a structural component, in particular a suspension link, wherein the ball joint housing is inserted into a through-going aperture of the structural component and the welding section of the ball joint housing is welded to the structural component. In one design the welding section is beveled on one side, and this on the side intended to rest in contact with the edge of the aperture in the structural component.

SUMMARY OF THE INVENTION

The purpose of the present invention is to provide a method and a product wherein the ball joint housing is additionally stabilized in the through-aperture, in order to permit the transmission of larger forces and torques from the ball joint to the structural component and conversely.

According to the present invention this objective is achieved by a method of the type concerned for producing a chassis module and a corresponding chassis module, having the characterizing features as described below.

Preferred embodiments and further developments are also described below.

Accordingly, the invention proposes a method for producing a chassis module that comprises a structural component with a through-aperture in which a ball joint housing is inserted. The outer periphery of the ball joint housing is connected all round to a section at the edge of the aperture by material-cohesive joining without a filler.

According to the invention, to stabilize the ball joint housing in the aperture, the ball joint housing is additionally connected, again by material-cohesive joining without a filler, to at least one inner wall section of the aperture at a distance away from the edge section.

In the context of the invention a structural component is understood to mean an areal planar sheet metal component which is curved or flat or partly curved and partly flat. Areal means that the material thickness of the structural component is very much smaller then its other dimensions. Preferably the material thickness is constant over the areal extension of the structural component, which is in particular of robust design. Alternatively, the structural component can also be assembled from a plurality of sheet sections connected to one another by material-cohesive joining. Such structural components, which are typically made up of sheet sections of different material grades and/or material thicknesses, the so-termed tailored blanks, are also for example produced by deep drawing or pressing.

A through-aperture in the context of the invention is understood to mean a perforation, whether or not of round shape, which extends through the structural component. The aperture is preferably surrounded completely by the structural component. The ball joint housing is in particular suitable for receiving a joint ball of a ball stud. It is preferably pot-shaped with an essentially hollow-cylindrical portion and a bottom portion integrally connected thereto. Alternatively, such a ball joint housing can also be made without a bottom portion connected integrally to it. The ball joint housing is preferably made by extrusion molding, in particular cold extrusion molding. Alternatively it can be made by deep drawing, machining or hot extrusion molding.

A section at the edge of the aperture is understood to mean a section of the aperture which is associated with one of the edges of the aperture. In the context of the invention an edge of the aperture is understood to mean the line of intersection formed by the inner wall of the aperture and one of the two major surfaces of the structural component separated by the amount of the material thickness. The all-round connection of the outer periphery of the ball joint housing to the edge section of the aperture can be arranged in such manner that the connection is a small distance away from an edge of the aperture, or such that the connection extends exactly up to the edge, or such that the edge is located within the connection, i.e. the connection extends over the edge section as far as one of the major surfaces of the structural component.

The all-round connections of the outer periphery of the ball joint housing to the structural component preferably extend parallel to the edges of the aperture. The additional all-round connection of the ball joint housing to at least one inner wall section of the aperture a distance away from the edge section can be arranged in such manner that the additional connection is a small distance apart from the edge opposite the edge section, or such that the additional connection extends exactly up to the edge opposite the edge section, or such that the edge opposite the edge section extends beyond the inner wall section as far as one of the major surfaces of the structural component. The ball joint housing can be connected all round to just one inner wall section at a distance away from the edge section, or to a plurality of inner wall sections of the aperture at a distance away from the edge section.

By virtue of the additional connection, the ball joint housing is stabilized in the aperture. Since the all-round connections of the outer periphery of the ball joint housing to the structural component are a distance apart from one another, tilting or bending torques acting on the ball joint housing can be absorbed particularly well and transferred to the structural component. Preferably the joint partners, namely the structural component and ball joint housing, have no surface coating. This has the advantage that no separate pretreatment of the surfaces of the joint partners is needed before the material-cohesive joining process.

Preferably, at least before the joining process the inner wall of the aperture and/or the outer peripheral surface of the ball joint housing facing it is/are contoured. In the context of the invention a contoured shape, referring to the inner wall of the aperture, is understood to mean an inner wall which, along any section through the central axis of the aperture, is not straight. Consequently, a non-contoured inner wall can have for example the shape of a cylindrical envelope surface or a truncated cone envelope surface. Analogously, the same applies to the outer peripheral surface of the ball joint housing that faces the inner wall of the aperture in the joined condition. By contouring the inner wall of the aperture and/or the outer peripheral surface of the ball joint housing facing toward the inner wall, optimum geometrical conditions can be provided for the material-cohesive joining of the two joint partners, namely the ball joint housing and the structural component, without any filler material. The inner wall of the aperture and at the same time also the outer peripheral surface of the ball joint housing facing it can both be contoured, at least before joining. If only the inner wall of the aperture or the outer peripheral surface of the ball joint housing facing it is contoured, then the inner wall or outer peripheral surface facing it is preferably designed as an envelope surface of a truncated cone. The contouring can extend over the entire inner wall of the aperture and/or the outer peripheral surface of the ball joint housing facing it, or over only parts of the surfaces.

Advantageously, the inner surface of the aperture is prepared by deformation, in particular by stamping.

For this, the aperture is advantageously first formed for example by perforation means of a stamping tool. Before or after the deformation to produce a contoured inner wall of the aperture, other work steps for preparing the structural component, such as bending, deep drawing, chamfering or cutting out can take place. The inner wall of the aperture is deformed in particular by stamping. In this way the contoured inner wall of the aperture can be produced economically in a single working stroke. Structural components with an aperture whose inner wall is made by deformation can be produced economically as part of a series or mass-production process using progressive composite tools or on assembly lines.

According to a further development of the invention the outer peripheral surface of the ball joint housing facing toward the inner wall of the aperture is prepared by a final machining process, in particular a machining process that requires only one clamping operation. By virtue of the machining, in particular turning, a defined geometry for the material-cohesive joining can be made reproducibly and with great dimensional accuracy. In the case of joining points a distance apart from one another, in order to achieve accuracy also in relation to the respective positions of the joining points the final machining is carried out in a single clamped setting. In this way inaccuracies caused by the re-clamping required for a plurality of machining operations are avoided. When joining with a filler material, dimensional variations can to a limited extent be compensated by means of fillers such as electrode material or welding wire material. Since this is not possible when joining without any filler, dimensional accuracy in the area of the joining points is in this case particularly important in order to be able to ensure constant high process quality in a mass-production operation.

Before the final machining, the ball joint housing is preferably made by extrusion molding. The nature of the process is such that no undercut geometrical regions, also called undercuts, can be obtained. In this connection undercuts are understood to be troublesome geometrical areas in a component produced by primary shaping or deformation, which prevent detachment of the component from the primary mold or from the deformation tool after it has been produced. Furthermore, the final machining makes it possible to introduce subsequent undercut geometrical areas in the ball joint housing. For example, a sealing bellows groove for the later fitting of a sealing bellows can be made in the ball joint housing in one working step during the final machining operation.

Preferably, as a preparation for joining, the structural component and the ball joint housing are brought together along a joint axis in such manner that the inner wall of the aperture and the outer peripheral surface of the ball joint housing facing it contact one another at the same time along a first, preferably closed, and at least along a second, preferably closed line of contact. This reproducible condition is well suited as a defined starting condition for the subsequent material-cohesive joining with no filler, because the process parameters for joining can be well adjusted to it. In the context of the present invention a joint axis is understood to mean a rectilinear movement path along which the joint partners are brought together in translation for joining and which, at the same time, is the line along which the force with which the joint partners are held together acts. The joint axis passes through the surfaces, preferably circular surfaces, around which the first and the at least second lines of contact extend. The joint partners are brought together along the joint axis in such manner that the structural component and the ball joint housing contact one another along the first and along the at least second line of contact simultaneously over the respective full lengths of the individual lines of contact. The simultaneous linear contact of the joint partners has the advantage that in contrast to contact at a point, the force with which the joint partners are held together when in contact is distributed over the line of contact as a whole. Moreover, by virtue of this simultaneous contact the positions of the two joint partners are ready for joining, so that no further relative movement of the joint partners in the area of the lines of contact is required. In this way damage in the form of undesired scratching and/or deformation of the joint partners in the area of the lines of contact is avoided.

Advantageously, at least two lines of contact are arranged parallel to one another and with offset in the direction of the joint axis. By virtue of the offset between the lines of contact in the direction of the joint axis the ball joint housing is additionally stabilized in the aperture of the structural component. The stabilization here is the greater, the larger is the offset between the at least two lines of contact, i.e. the larger the distance between the lines of contact. There may be exactly two, or even more than two lines of contact arranged parallel to one another and in the direction of the joint axis.

Particularly advantageously, the central axis of the ball joint housing and the central axis of the aperture coincide with the joint axis. In such a case the joint axis preferably extends perpendicularly to the surfaces covered by the lines of contact. For example, this is so when a rotationally symmetrical ball joint housing is joined to a structural component having a circular-shaped aperture. The rotationally symmetrical design of the ball joint housing has the advantage that the final machining can be done by relatively inexpensive turning. In this preferred embodiment the lines of contact are in the form of circular lines in each case enclosing a circular surface, such that the central perpendiculars of the circular surfaces also coincide with the joint axis. If the joint axis extends perpendicularly to the surfaces containing the lines of contact and if it passes through the respective mid-points of the surfaces, then during the joining process no undesired transverse forces occur, which during the course of joining could result in undesired displacement of the joint partners in the area of the lines of contact.

In one design of the invention the contouring of the inner wall of the aperture and/or that of the outer periphery of the ball joint housing facing it is formed in such manner that on contact in the area of the lines of contact, when viewing a longitudinal section through the joint axis, in each case an edge encounters an inclined surface. Such a design of the lines of contact has the advantage that before joining, the components are self-centering by virtue of their geometry. In this case the edges are in particular associated with the ball joint housing and, in particular, are produced during the final machining of the ball joint housing. Looking at the aforesaid section, the edges are preferably essentially right-angled with arms that extend in the direction of the joint axis and perpendicular thereto. Thus, the edges preferably enclose an angle of 90°. The inclined surfaces are in particular associated with the inner wall of the aperture and are produced by pressing. Linear contact between the joint partners, namely the ball joint housing and the structural component, is achieved in that the edges meet the inclined surfaces substantially symmetrically. This means that the angle between the inclined surface and the first arm of the edge is the same size as the angle enclosed by the inclined surface and the second arm of the edge. The angle enclosed by the inclined surface and the first arm and by the inclined surface and the second arm of the edge is preferably 45° in each case.

In an advantageous further development of the invention, just before joining, the structural component and the ball joint housing are acted upon by a pre-stressing force directed along the joint axis, in order to bring the edges in the area of the line arrays fully into contact with the associated inclined surfaces. Owing to manufacturing tolerances it can happen that the joint partners are not simultaneously in contact over the full lengths of the lines of contact before joining. By applying the pre-stressing force that acts along the joint axis, in particular a slight deformation of the edges is produced in the area where the joint partners are already in contact without the action of the pre-stressing force. By virtue of this local deformation of the edges an adjustment is achieved, so that subsequently there is full linear contact in the area of the lines of contact. For this purpose the edges, in particular those associated with the ball joint housing, are preferably made relatively sharp during the final machining so that they can deform slightly under the action of the pre-stressing force.

Advantageously, the material-cohesive joining without filler is carried out by resistance welding, in particular condenser discharge welding. In resistance welding electric current flows through the joint partners and through the lines of contact over the full length of which the joint partners are in contact just before the beginning of the resistance welding. The linear contact has the advantage that in this area the contact resistance is higher, which brings about a softening of the joint partners in the area of the lines of contact. The previously described form of the edges and inclined surfaces is designed to promote this. With an areal contact of the inner wall of the aperture and the outer peripheral surface of the ball joint housing facing it, for example a common contact surface in the shape of a truncated cone envelope surface, the contact resistance would be very small. In that case a load-bearing resistance weld, particularly if the structural component is relatively thick, would be relatively difficult to produce because the contact resistance would not be sufficient to soften the joint partners in the area of their common contact surface.

If the lines of contact extend all round, in the surrounding closed area between the lines of contact the resistance welds have a screening action against corrosive media. The area between the all-round lines of contact or—if there are more than two all-round lines of contact—the areas between them is/are therefore protected against corrosion without any additional surface protection.

In contrast, owing to the linear contact described earlier an intimate connection of the two joint partners ball joint housing and structural component is made possible by the resistance welding. Particularly with condenser discharge welding, thanks to the process-inherent short welding time and local energy concentration the heat-affected zones are kept small. In this way distortion of the joint partners and undesired structure changes in the area of the joint positions are very largely avoided. The efficiency of condenser discharge welding is high, since there is hardly any energy loss due to heat conduction. Besides condenser discharge welding, medium-frequency welding is also suitable. Particularly good welding results are achieved if the central axis of the ball joint housing and the central axis of the aperture coincide with the joint axis and the lines of contact are circular.

According to a further development of the invention, the connection between the structural component and the ball joint housing is reinforced at least selectively by material-cohesive joining using a filler. In the chassis module comprising the ball joint housing and the structural component, when fitted into the vehicle local load peaks can occur in the area of joint sites between the ball joint housing and the structural component. Such load peaks can for example be caused by braking maneuvers, driving round bends or striking the curbstone, and their positions can be identified by calculations and tests. For reasons of economy and weight it is preferred to reinforce the chassis module only in the area of these load peaks. Furthermore, since the same chassis module is often used in different vehicle models it can happen that, depending on the vehicle model, the at least selective reinforcement of the connection between the structural component and the ball joint housing by material-cohesive joining with a filler has to be carried out differently. The processes of material-cohesive joining with a filler in this case offer the necessary flexibility, without any need for additional investments in equipment.

Advantageously, the material-cohesive joining with a filler is carried out by protective gas welding, in particular MAG welding. Protective gas welding is an arc welding process in which a welding wire is fed in continuously by a variable-speed motor. At the same time as the wire feed a protective or a mixed gas is directed onto the weld site by a nozzle. Protective gas welding has the advantage that is can easily be automated. Without much equipment expenditure, protective gas welding robots can be adapted to the particular parameters concerned, such as the cross-section, position and length of the weld seams for the at least selective reinforcement of the joint between the structural component and the ball joint housing. Metal-active-gas (MAG) welding is particularly suitable for steel materials.

In addition, the invention relates to a chassis module comprising a structural component and a ball joint housing, which chassis module is produced by a method as described above. The invention proposes that the chassis module is in the form of a flanged connector or a multi-point link. In the context of the invention a flanged connector is understood to mean a chassis module formed of a ball joint and a connecting flange, such that the connecting flange serves for the connection of the flanged connector to some other chassis component, for example a steering component. In the context of the invention a multi-point link is understood to mean a chassis link with more than one connection point, at least one of the connection points comprising a ball joint. Referring to the number of connection points, such a link is also known for example as a two-point, a three-point or a four-point link.

When the ball joint housing has been inserted into the aperture of the structural component and the structural component and the ball joint housing have been connected by material-cohesive joining, no further welding operations on the chassis module formed by the flanged connector or the multi-point link are needed. Thus, the chassis module has the advantage that it can be provided with all-over corrosion protection which remains in place during later completion work. For flanged connectors and multi-point links effective corrosion protection is particularly important because owing to the positions where they are fitted in the vehicle, they are very much exposed to environmental influences that promote corrosion, such as moisture and road salt.

In the case of narrow all-round crevices there is a risk that they cannot be protected from corrosion by surface protection, because due to the nature of the process, surface protection means cannot penetrate into narrow crevices, or only insufficiently so. In a surface coating process by electroplating and in cathodic dip coating (CDC-process), which is often used in the automobile industry, the ability to penetrate into narrow crevices is restricted by the so-termed Faraday effect. Even in dip coating with no current and in spray painting there is a risk that narrow all-round crevices will not be sealed by surface protection, or that the surfaces bounding the crevice will not be covered by a surface protection treatment, or only incompletely so. If moisture from the environment in which chassis components are fitted, for example thrown up from puddles, penetrates into narrow all-round crevices due to capillary action, then unless the surfaces are fully protected this can result in so-termed crevice corrosion. To avoid crevice corrosion peripheral areas between the inner wall of the aperture and the outside of the ball joint housing facing it, if they are open to the environment and are not enclosed by all-round linear resistance welds, are therefore preferably of open design. In this connection an open peripheral area is understood to mean a preferably all-round gap whose width, also called the gap size, is large enough for the surface protection to be able to penetrate and completely cover the surfaces inside the gap.

Advantageously, the ball joint housing is part of a radial ball joint, an axial ball joint or a ball sleeve joint. Ball joint housings of the above-described type can be in the form of housings or parts of housings of radial ball joints, axial ball joints or ball sleeve joints. In the case of a ball joint housing which has already been joined to a structural component by welding, only afterward assembling it further to form a complete ball joint has the advantage that components of the ball joint fitted inside the ball joint housing, such as a plastic bearing shell, can no longer be damaged by the heat produced during welding.

BRIEF DESCRIPTION OF THE DRAWINGS

Below, the invention is explained in more detail with reference to a drawing which illustrates only one example embodiment, wherein the same indexes are used for the same, similar, or functionally equivalent components. The figures show.

DETAILED DESCRIPTION OF THE PREFERRED EMBODIMENTS

Figure 1:
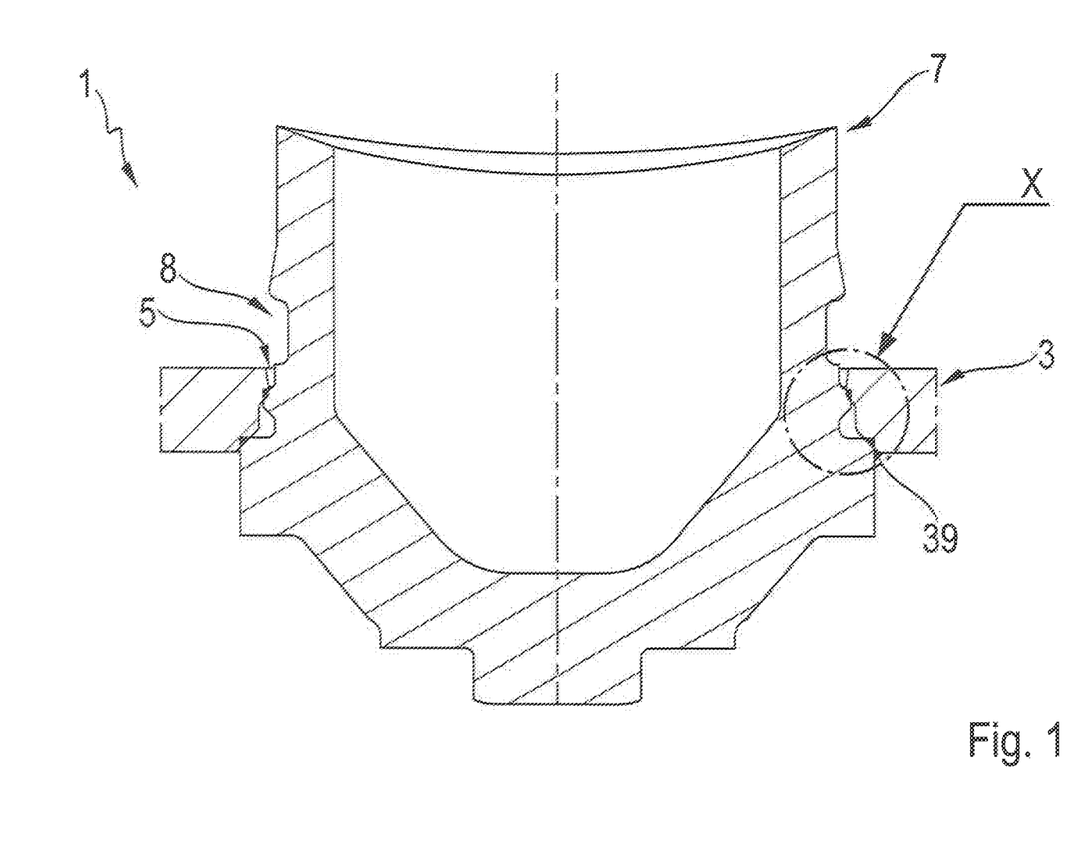
FIG. 1: A sectioned view of a chassis module according to the invention.

FIG. 1 shows a chassis module 1, which comprises a structural component 3 with a through-going aperture 5 and a ball joint housing 7 held therein. The ball joint housing is pot-shaped with a hollow-cylindrical portion and a bottom portion connected integrally thereto, and is produced by cold extrusion molding. The outer periphery of the ball joint housing 7 has a sealing bellows groove 8 for the later fitting of a sealing bellows.

Figure 2:
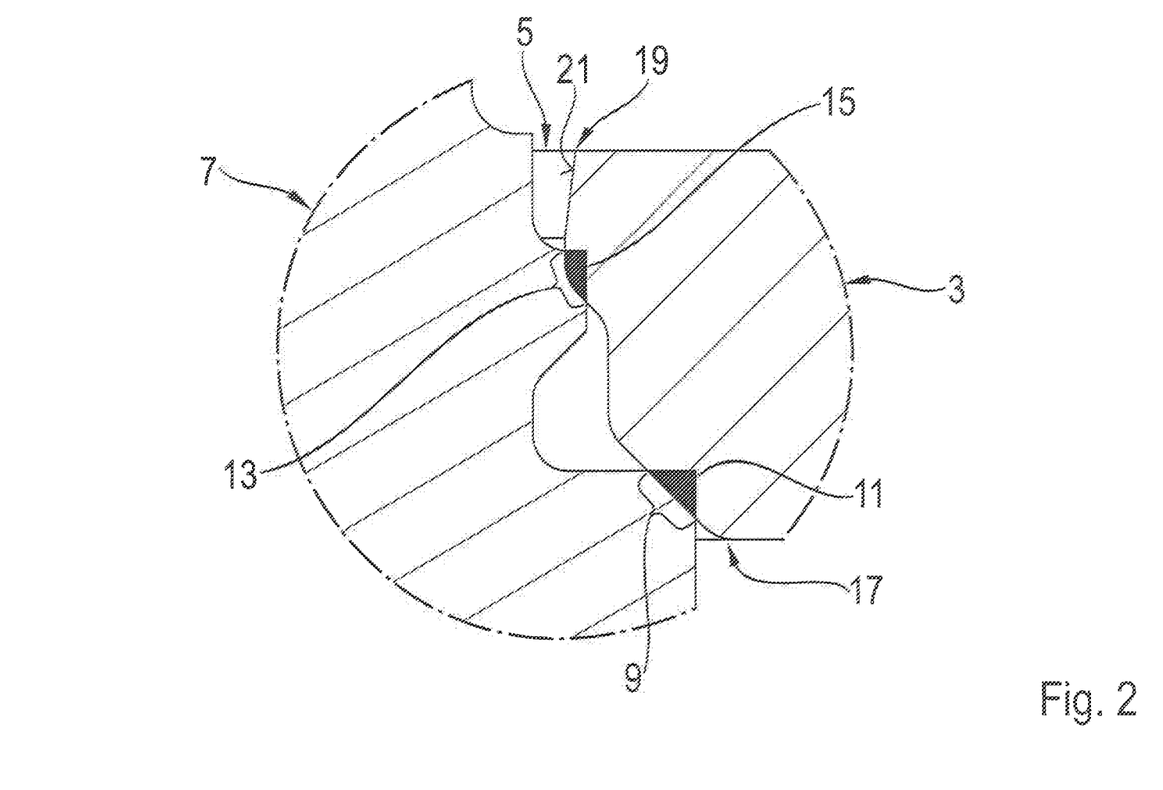
FIG. 2: An enlarged view of the detail X in FIG. 1.

FIG. 2 shows the structural component 3 with its aperture 5 in which the ball joint housing 7 is inserted. The outer periphery of the ball joint housing 7 is connected all round to an edge section 9 of the aperture 5 by means of a resistance weld 11 made by condenser discharge welding. To stabilize it in the aperture 5 the ball joint housing 7 is connected by an additional resistance weld 15 to an inner wall section 13 of the aperture 5 a distance away from the edge section 9. The all-round connection of the outer periphery of the ball joint housing 7 to the edge section 9 of the aperture 5 by the resistance weld 11 is positioned in such manner that the resistance weld 11 is a small distance away from an edge 17 of the aperture 5.

The all-round resistance weld 11 and the all-round additional resistance weld 15 for joining the outer periphery of the ball joint housing 7 to the structural component 3 extend parallel to the edges 17, 19 of the aperture 5. The additional resistance weld 15 is arranged in such manner that it is a short distance away from the edge 19 of the aperture 5 opposite the edge section 9. The joint partners structural component and ball joint housing 7 have no surface coating.

Figure 3:
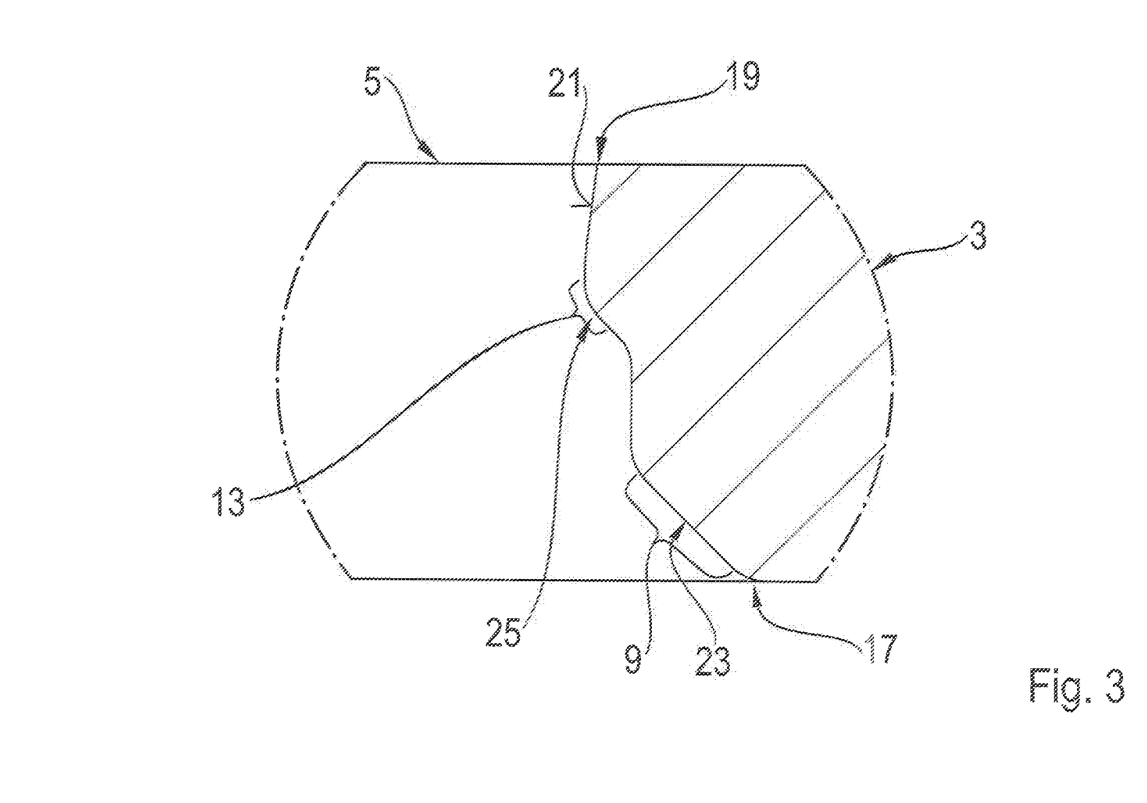
FIG. 3: An enlarged view of the detail X in FIG. 1, wherein the ball joint housing is not shown.

FIG. 3 shows the inner wall 21 of the aperture 5 with the edge section 9 and the inner wall section 13. Over its full extension from one edge 17 to the opposite edge 19 of the aperture 5 the inner wall 21 is contoured. To produce the contoured inner wall 21, the aperture 5 is first made in the structural component 3 by perforation with a stamping tool. The inner wall 21 is then contoured by pressing. In the area of the edge section 9 and in the area of the inner wall 13, the contoured inner wall 21 has in each case an inclined surface 23, 25.

Figure 4:
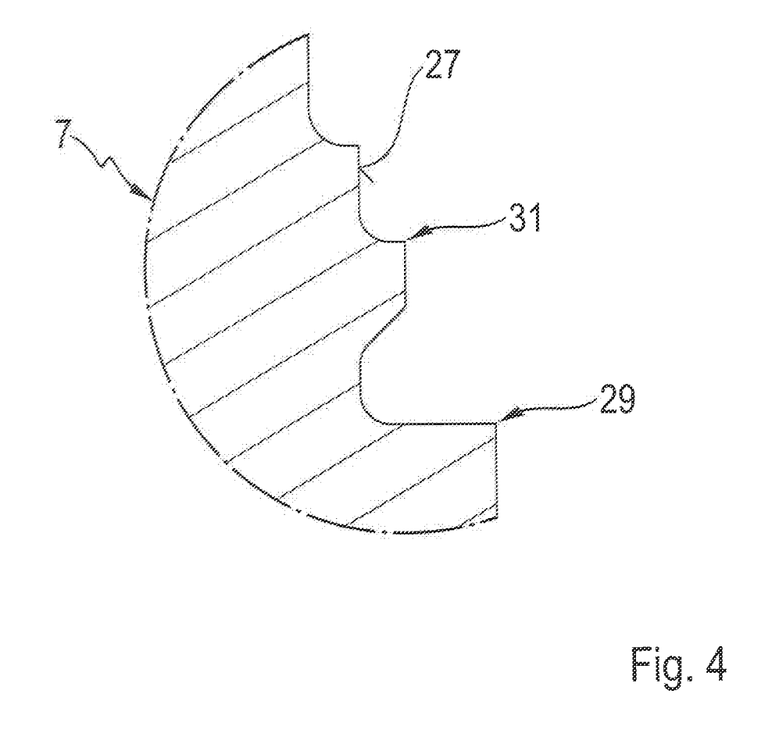
FIG. 4: An enlarged view of the detail X in FIG. 1, wherein the structural component is not shown.

FIG. 4 shows the outer peripheral surface 27 of the ball joint housing 7 that faces toward the inner wall 21 of the aperture 5. This outer peripheral surface 27 is also contoured, with a shape that comprises two edges 29, 31. The contour of the of the outer peripheral surface 27, including the two edges 29, 31 and the sealing bellows groove 8 shown fully in FIG. 1, is produced by turning in just one clamped position. During this the tolerances for the relative positions of the two edges 29, 31 and for their shape are relatively close. Owing to the presence of undercut geometrical areas this contour cannot be produced by extrusion molding.

Figure 5:
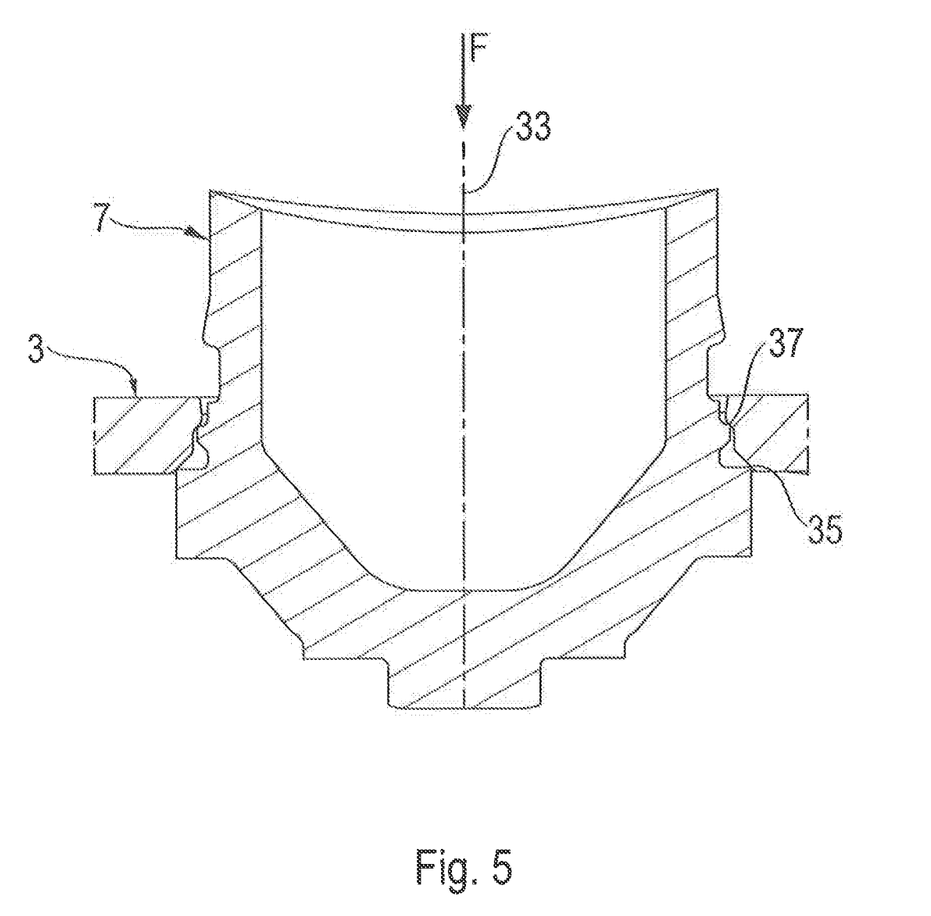
FIG. 5: A sectioned view of the ball joint housing and the structural component immediately before the joining of the chassis module.

Considered together with FIGS. 3 and 4, FIG. 5 shows that as the preparation for joining, the structural component 3 and the ball joint housing 7 are brought together along a joint axis 33 in such manner that the inner wall 21 of the aperture 5 and the outer peripheral surface 27 of the ball joint housing 7 facing it contact one another along a first closed line 35 and at the same time a second closed line 37. The central axis of the ball joint housing 7 and the central axis of the aperture coincide with the joint axis 33. The contouring of the inner wall 21 of the aperture 5 and that of the outer peripheral surface 27 of the ball joint housing 7 facing it are designed such that on contacting one another in the area of the contact lines 35 and 37, when viewed in the longitudinal section through the joint axis 33 as shown, in each case an edge 29, 31 encounters an inclined surface 23, 25 respectively, the edge 29 being associated with the inclined surface 23 and the edge 31 with the surface 25. The edge 29 and the inclined surface 23 are in contact along the first all-round line 35, while the edge 31 and the inclined surface 25 are in contact along the second all-round line 37. The edges 29, 31 are right-angled with arms that extend in the direction toward the joint axis 33 and in the direction perpendicular to that. Thus, the edges 29, 31 enclose an angle of 90° in each case. The angle between the inclined surfaces 23, 25 and the first arm of the edges 29, 31 is in each case 45°, the same size as the angle enclosed between the inclined surfaces 23, 25 and the respective second arm of the edges 29, 31.

Just before the resistance welding, the structural component 3 and the ball joint housing 7 are acted upon by a pre-stressing force F directed along the joint axis 33, in order to bring the edges 29, 31 into contact with their associated inclined surfaces 23, 25 in the area of the contact lines 35, 37 if, owing to manufacturing tolerances, this is not already completely the case. The edges 29, 31 associated with the ball joint housing 7 are made relatively sharp during the final machining process, so that under the action of the pre-stressing force F they can deform relatively easily and thereby come in contact with the associated inclined surfaces 23, 25.

The connection between the structural component 3 and the ball joint 5 housing 7 is selectively reinforced by material-cohesive joining using a filler. FIG. 1 shows a partial protective gas weld 39 made by MAG welding, in the form of a fillet weld which does not extend all round.

Figure 6:
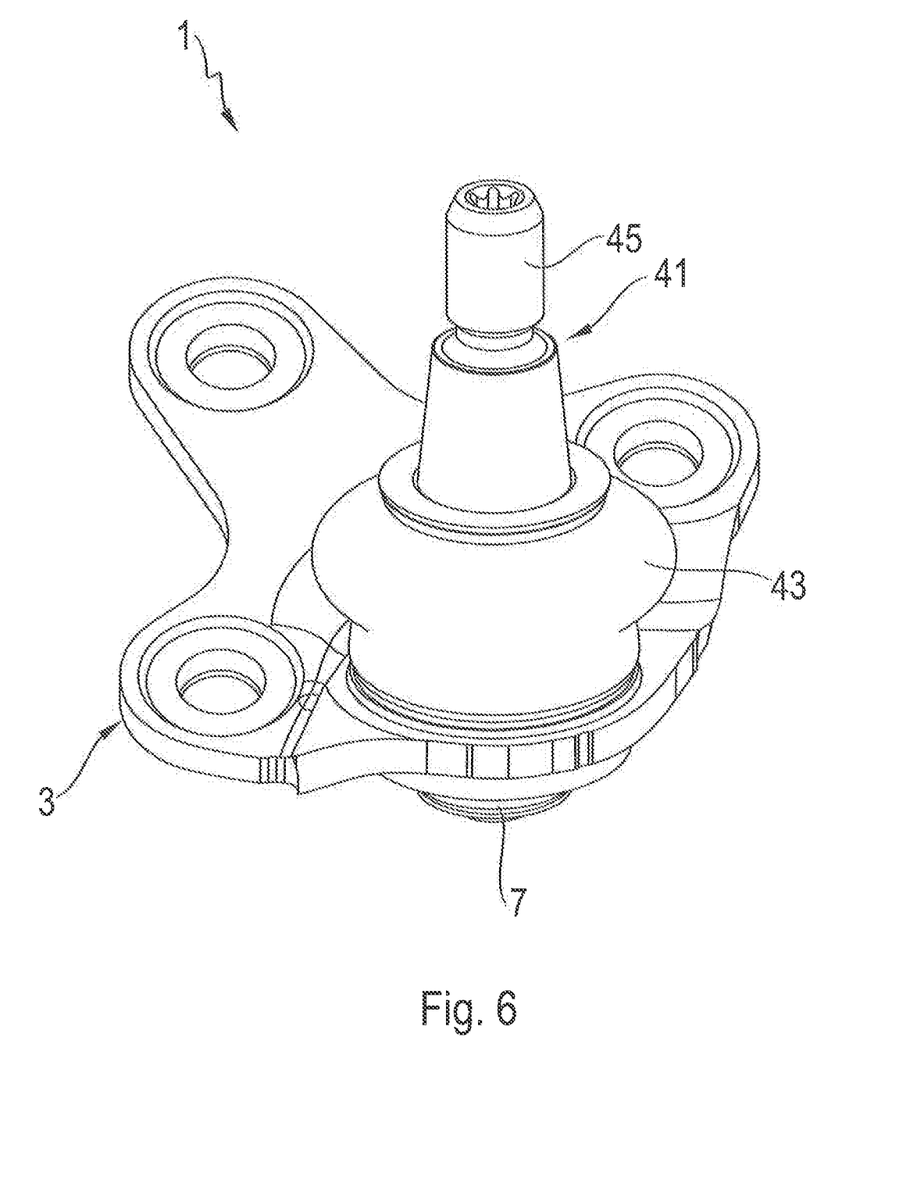
FIG. 6: A chassis module in the form of a flanged connector.

FIG. 6 shows a chassis module in the form of a flanged joint 1, comprising a radial ball joint 41 and a structural component 3 in the form of a connecting flange. The ball joint housing 7 is largely covered by a sealing bellows 43, which at one end engages in the sealing bellows groove 8 (not visible) of the ball joint housing 7. Extending outward from the sealing bellows 43 is one end of a ball stud 45 whose opposite end has a joint ball which is held and able to rotate and swivel in the ball joint housing 7.

INDEXES

1 Chassis module, flanged joint
3 Structural component, connecting flange
5 Through-going aperture
7 Ball joint housing
8 Sealing bellows groove
9 Edge section
11 Resistance weld
13 Inner wall section
15 Additional resistance weld
17 Edge of the aperture
19 Edge of the aperture
21 Inner wall of the aperture
23 Inclined surface
25 Inclined surface
27 Outer peripheral surface
29 Edge
31 Edge
33 Joint axis
35 First line of contact
37 Second line of contact
39 Protective gas weld, MAG weld
41 Radial ball joint
43 Sealing bellows
45 Ball stud
F Pre-stressing force

The invention claimed is:

1. A method of producing a chassis module that has a structural component with a through-going aperture into which a ball joint housing is inserted, the method comprising:
   connecting an outer periphery of the ball joint housing all round to an edge section of the aperture by a first material-cohesive joining without a filler, and
   stabilizing the ball joint housing in the aperture by additionally connecting the ball joint housing all round to at least one inner wall section of the aperture at a distance spaced away from the edge section by a second material-cohesive joining without a filler.

2. The method according to claim 1, further comprising contouring at least one of an inner wall of the aperture and an outer peripheral surface of the ball joint housing, facing toward the inner wall of the aperture, before joining inner wall of the aperture and the peripheral surface of the ball joint housing.

3. The method according to claim 2, further comprising preparing the inner wall of the aperture by stamping.

4. The method according to claim 2, further comprising preparing the outer peripheral surface of the ball joint housing, that faces toward the inner wall of the aperture, by a machining operation in one clamped setting.

5. The method according to claim 2, further comprising bringing together the structural component and the ball joint housing along a joint axis, prior to the joining operation, in such a manner that the inner wall of the aperture and the outer peripheral surface of the ball joint housing, that faces toward the inner wall of the aperture, contact one another at the same time along a first, closed line of contact and along at least one second, closed line of contact.

6. The method according to claim 5, further comprising bringing together the structural component and the ball joint housing such that the first and the second closed lines of contact are arranged parallel to one another and offset relative to one another in a direction of the joint axis.

7. The method according to claim 5, further comprising bringing together the structural component and the ball joint housing such that a central axis of the ball joint housing and a central axis of the aperture coincide with the joint axis.

8. The method according to claim 5, further comprising designing the contouring at least one of the inner wall of the aperture and the outer peripheral surface of the ball joint housing facing the inner wall such that when in contact in an area of the first and the second closed lines of contact, as viewed in a longitudinal section through the joint axis, in each case an edge encounters an inclined surface.

9. The method according to claim 8, further comprising immediately before joining, subjecting the structural component and the ball joint housing to a pre-stressing force that acts along the joint axis to bring the edges fully into contact with the associated inclined surfaces in the area of the first and the second closed lines of contact.

10. The method according to claim 1, further comprising carrying out the material-cohesive joining, with no filler, by either resistance welding or condenser discharge welding.

11. The method according to claim 1, further comprising at least selectively reinforcing the joint, between the structural component and the ball joint housing, by a material-cohesive joining using a filler.

12. The method according to claim 11, further comprising carrying out the material-cohesive joining using the filler by either protective gas welding or Metal-active-gas (MAG) welding.

13. A chassis module comprising a structural component and a ball joint housing, the structural component has a through-going aperture into which a ball joint housing is inserted,
- an outer periphery of the ball joint housing being connected all round to an edge section of the aperture by a material-cohesive joining without a filler, and
- the ball joint housing being stabilized in the aperture by additionally connecting the ball joint housing all round to at least one inner wall section of the aperture at a distance spaced away from the edge section by a material-cohesive joining without a filler, and
- the chassis module is either a flanged connector or a multi-point link.

14. The chassis module according to claim 13, wherein the ball joint housing is part of one of:
- a radial ball joint;
- an axial ball joint; and
- a ball sleeve joint.

15. A method of producing a chassis module having a structural component with a through-going aperture, the method comprising:
- inserting a ball joint housing into the through-going aperture of the structural component;
- fixing a first annular outer periphery of the ball joint housing to an annular edge section of the aperture by material-cohesive joining, without a filler, such that a central axis of the ball joint housing is coaxially aligned with a central axis defined by the through-going aperture of the structural component, and
- stabilizing the ball joint housing in the aperture of the structural component by additionally fixing a second annular outer periphery of the ball joint housing to at least an annular inner wall section of the aperture by material-cohesive joining, without a filler, and the annular inner wall section of the aperture is axially and radially spaced at a distance from the annular edge section of the aperture.

* * * * *